(12) United States Patent
Syed et al.

(10) Patent No.: US 11,808,395 B2
(45) Date of Patent: Nov. 7, 2023

(54) PNEUMATIC PLUG WITH SEALING LAYER

(71) Applicant: CHERNE INDUSTRIES INCORPORATED, Minneapolis, MN (US)

(72) Inventors: Asim Mohammed Syed, Chanhassen, MN (US); Micah Thomas Olson, Eagan, MN (US)

(73) Assignee: Cherne Industries Incorporated, Minneapolis, MN (US)

( * ) Notice: Subject to any disclaimer, the term of this patent is extended or adjusted under 35 U.S.C. 154(b) by 518 days.

(21) Appl. No.: 16/814,124

(22) Filed: Mar. 10, 2020

(65) Prior Publication Data
US 2020/0309309 A1    Oct. 1, 2020

Related U.S. Application Data

(60) Provisional application No. 62/825,196, filed on Mar. 28, 2019.

(51) Int. Cl.
| | |
|---|---|
| *F16L 55/12* | (2006.01) |
| *B32B 37/16* | (2006.01) |
| *F16L 55/11* | (2006.01) |
| *F16L 55/128* | (2006.01) |
| *B32B 37/06* | (2006.01) |
| *B29C 53/60* | (2006.01) |
| *B29C 53/58* | (2006.01) |
| *B29D 22/02* | (2006.01) |
| *B32B 1/08* | (2006.01) |
| *B32B 38/00* | (2006.01) |

(52) U.S. Cl.
CPC ............ *F16L 55/12* (2013.01); *B29C 53/585* (2013.01); *B29C 53/602* (2013.01); *B29D 22/02* (2013.01); *B32B 1/08* (2013.01); *B32B 37/06* (2013.01); *B32B 37/16* (2013.01); *F16L 55/1141* (2013.01); *F16L 55/1283* (2013.01); *B32B 2038/0076* (2013.01); *B32B 2262/0261* (2013.01); *B32B 2262/0269* (2013.01); *B32B 2305/72* (2013.01); *B32B 2317/22* (2013.01)

(58) Field of Classification Search
CPC ... F16L 55/12; F16L 55/1141; F16L 55/1283; F16L 55/134; B29C 53/585; B29C 53/602; B29D 22/02; B32B 1/08; B32B 37/06; B32B 37/16; B32B 2038/0076; B32B 2262/0261; B32B 2262/0269; B32B 2305/72; B32B 2317/22; B32B 5/02; B32B 25/10; B32B 2581/00; B32B 3/08
See application file for complete search history.

(56) References Cited

U.S. PATENT DOCUMENTS

| | | | | |
|---|---|---|---|---|
| 4,424,861 A | * | 1/1984 | Carter, Jr. | F16J 15/46 166/212 |
| 2004/0216794 A1 | * | 11/2004 | Beckey | F16L 55/134 138/93 |

* cited by examiner

*Primary Examiner* — Christopher T Schatz
(74) *Attorney, Agent, or Firm* — BakerHostetler

(57) ABSTRACT

An pneumatic plug for sealing a pipeline. The pneumatic plug includes a tubular member that extends in an axial direction from a first end to a second end. The tubular member includes a rubber layer and an elastomeric band. The rubber layer extends from the first end to the second end of the tubular member. The elastomeric band is disposed on a top of the rubber layer. The elastomeric band is positioned between the first end and the second end of the tubular member.

9 Claims, 4 Drawing Sheets

PNEUMATIC PLUG WITH SEALING LAYER

CROSS-REFERENCE TO RELATED APPLICATIONS

This application claims the benefit of U.S. Provisional Application No. 62/825,196, filed Mar. 28, 2019, the disclosure of which is incorporated by reference herein in its entirety.

TECHNICAL FIELD

This disclosure relates generally to a pipeline sealing system and, more particularly, to a system and method for pneumatic plugs.

BACKGROUND

Pipelines are generally known to transport fluids (liquids or gases) over a physical distance within the internal channels of the constituent individual pipe sections. There are multiple situations that require blocking the transport of fluids within the pipeline that include, for example, blocking the flow in an active line, pressure testing of a new installation by blocking ends of the pipeline and pressure testing the space in between, transporting fluid in an active pipeline from one part of the pipeline to another part, temporarily holding back a water surge in a storm pipeline, repairing a downstream section of the pipeline, or for other reasons. In each of these situations, the pipeline is sealed to prevent any fluid or debris from entering the section of the pipeline.

Current systems for sealing pipe sections include the use of pneumatic plugs. For example, the pneumatic plug may be inserted upstream of a damaged pipe section, and inflated. The inflated plug interfaces with an inner surface of the pipeline forming a seal. The strength of the seal depends upon the material of the plug, the outer surface of the plug, and how the outer surface interfaces with the inner wall of the pipeline. Current pneumatic plugs include an outer surface of cured rubber that forms a tubular body. During the curing process, heat tape is wrapped around the outer surface of the plug to form a dedicated mold. After curing, the heat tape is removed leaving a pattern or impression on the outer surface. The sealing capacity of the tubular body is decreased during operation because of fluid leakage through the impression formed by the tape, which can result in, for example, failed pressure testing.

Therefore, there is a need for a pneumatic plug and method for manufacturing a pneumatic plug having increased sealing capability to prevent leaks within pipelines.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein.

SUMMARY

The foregoing needs are met, to a great extent, by the pneumatic plug disclosed in the present application. With conventional plugs, heat tape is used during the curing process to form the tubular body of the plug. However, the tape is narrow, and regardless of how the tape is wrapped (e.g. pattern of tape), there are gaps (e.g. radial gaps or leak path) and/or impressions that are formed on the outer surface of the tubular member. The gaps lead to air leakage, which can prevent the pneumatic plug from performing its intended purpose. As described in the present application, an elastomeric band is added to the outer surface of the plug. The elastomeric band continuously extends circumferentially about the body of the plug and extends continuously along an axial extent of the plug, with minimal gaps formed therein. The band forms a single unitary body, that when in contact with an inner surface of a pipeline, substantially prevents leakage through the plug allowing for an increased requirement for holding back pressure.

An aspect of the present disclosure provides a pneumatic plug for sealing a pipeline. The pneumatic plug comprises a tubular member extending in an axial direction from a first end to a second end. The tubular member comprises a rubber layer and an elastomeric layer. The rubber layer extends from the first end to the second end of the tubular member. The elastomeric band is disposed on a top of the rubber layer. The elastomeric band is positioned between the first end and the second end of the tubular member.

Another aspect of the present disclosure includes a method for manufacturing a pneumatic plug. The method comprising: disposing a rubber layer about a mandrel, the rubber layer extending in an axial direction from a first end to a second end forming a tubular member; and positioning an elastomeric band between the first end and the second end of the tubular member on a top surface of the rubber layer. The method further comprises: curing the tubular member and the elastomeric band positioned on the top surface of the rubber layer to form a vulcanized plug.

This summary is provided to introduce a selection of concepts in a simplified form that are further described below in the Detailed Description section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there are shown in the drawings illustrative embodiments of the disclosure. It should be understood, however, that the application is not limited to the precise arrangements and instrumentalities shown. In the drawings.

DETAILED DESCRIPTION

Figure 1:
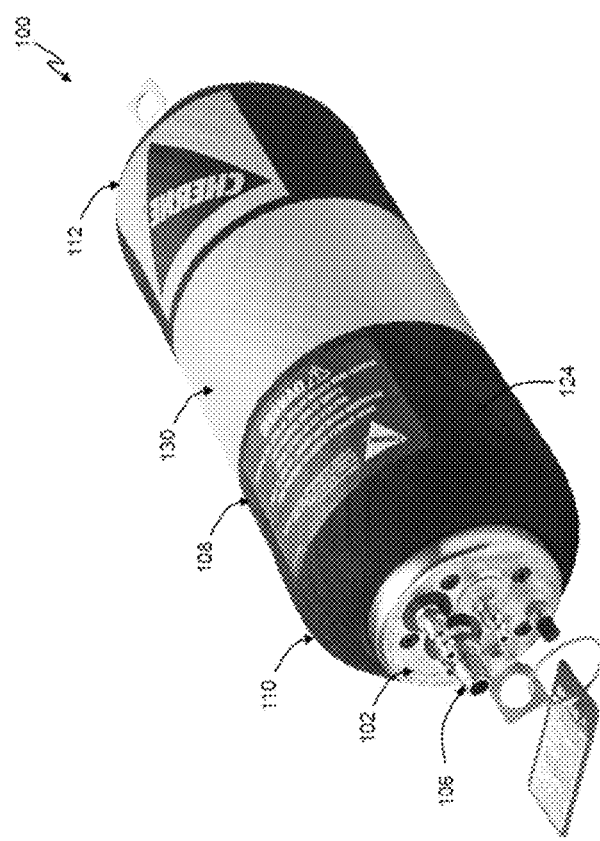
FIG. 1 provides perspective views of a pneumatic plug, according to an aspect of this disclosure.
Figure 1:
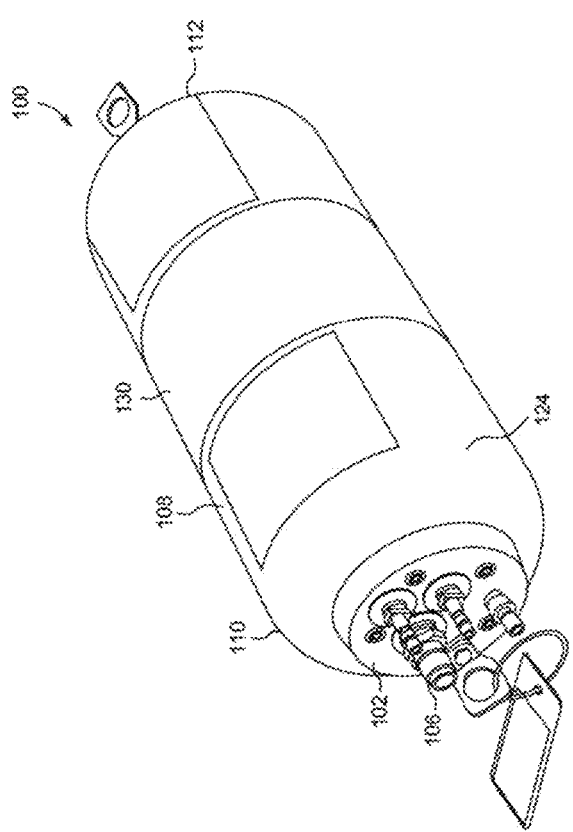

A pneumatic plug used for sealing and maintenance of pipelines is disclosed. The pneumatic plug is configured to fit within a pipeline and inflate to a predetermined pressure. When the inflatable plug reaches the predetermined pressure, an outer surface of the inflatable plug contacts an inner surface of the pipeline. The contact between the outer surface of the plug and the inner surface of the pipeline forms a substantially fluid tight seal allowing for downstream repair and maintenance. The pneumatic plug comprises a tubular body that includes an elastomeric band that extends about an outer surface of the tubular body. When the tubular body is inflated, the elastomeric band contacts the inner surface of the pipeline forming a substantially fluid tight seal.

Certain terminology used in this description is for convenience only and is not limiting. The words "axial", "transverse," and "radial" designate directions in the drawings to which reference is made. The term "substantially" is intended to mean considerable in extent or largely but not necessarily wholly that which is specified. All ranges disclosed herein are inclusive of the recited endpoint and independently combinable (for example, the range of "from 2 grams to 10 grams" is inclusive of the endpoints, 2 grams and 10 grams, and all the intermediate values). The terminology includes the above-listed words, derivatives thereof and words of similar import.

Figure 2:
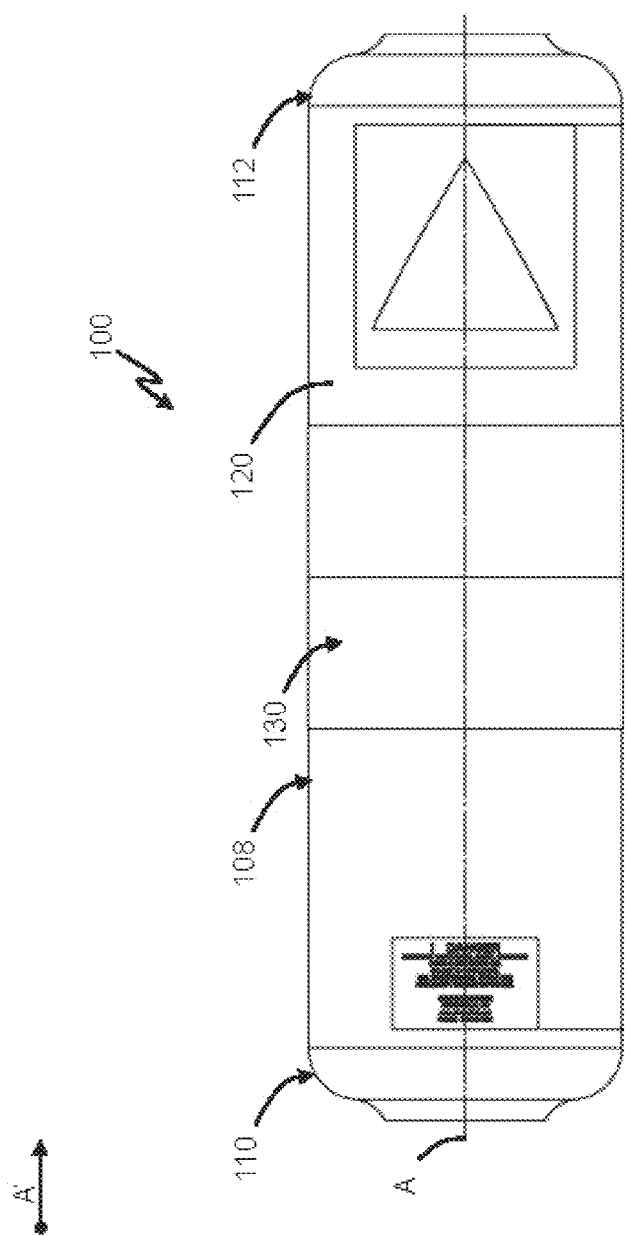
FIG. 2 is a side view of the pneumatic plug shown in FIG. 1, according to an aspect of this disclosure.
Figure 3:
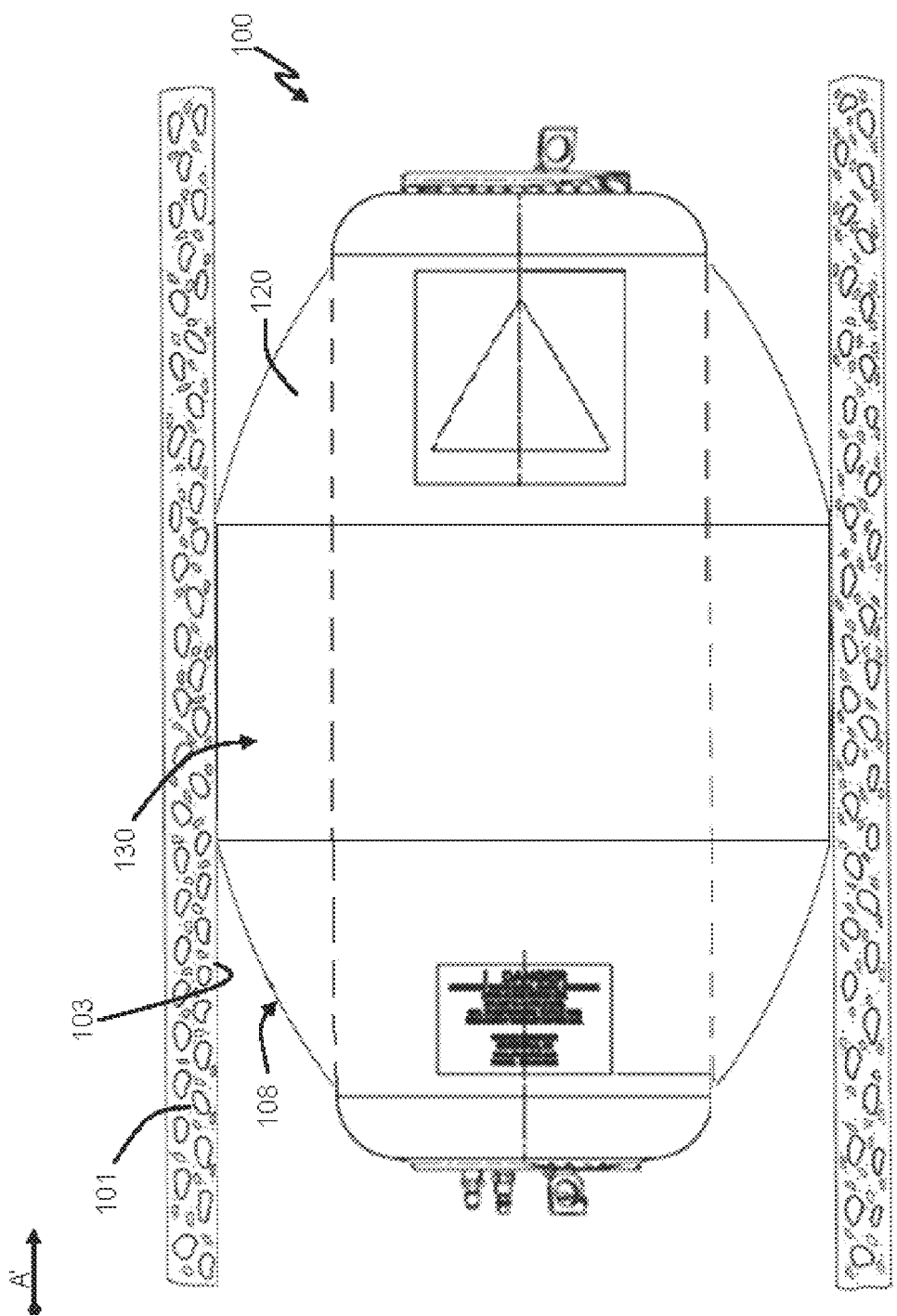
FIG. 3 is a side view of the plug shown in FIG. 1 in an inflated configuration positioned within a pipeline, according to an aspect of this disclosure.

FIG. 1 illustrates a pneumatic plug 100 for sealing a pipeline, FIG. 2 illustrates a side view of a tubular member 108 of the pneumatic plug 100, and FIG. 3 illustrates a side view of the pneumatic plug 100 in an inflated configuration positioned within a pipeline 101, according to aspects of this disclosure. The plug 100 is sized and configured to be inserted into the pipeline 101 to a location that is to be sealed. The plug 100 is inflatable to form a tight seal between the plug 100 and with an internal surface area of the pipeline 101 (see FIG. 3). More particularly, the plug 100 is adapted to wholly or partially contact the internal surface area that extends circumferentially about the interior of the pipeline.

The plug 100 includes a first end plate assembly 102, a second end plate assembly (not visible in figures), a flow-through conduit 106, the tubular member 108, and an elastomeric band 130. The plug 100 has a generally cylindrical shape that is elongate along an axis A, which extends centrally through the plug 100, from a first end 110 to a second end 112. The tubular member 108 and the flow-through conduit 106 are coupled to the first end plate assembly 102 at the first end 110 and coupled to the second end plate assembly at the second end 112.

The plug 100 defines an outer diameter that may be increased upon inflation of the plug 100 to substantially match an inner diameter of a pipeline. The plug 100 is configured to be inflated so as to define a multi-range plug. For example, the plug 100 may be inflated such that the outer diameter of the plug 100 may be increased by 4-6 inches to conform to a range of internal diameters of an inner surface 103 of the pipeline 101. It will be appreciated that other inflation ranges may be contemplated. Inflating the plug 100 to increase the outer diameter enables the plug 100 to conform to surface irregularities of the inner surface 103 of the pipeline 101 in order to cause uniform sealing.

A single plug size of the plug 100 may accommodate many differently sized pipelines. For example, the plug 100 illustrated in FIG. 1 may accommodate pipelines with inner diameters that range from 8 to 12 inches. In alternative aspects, the plug 100 may be sized to accommodate different sized pipelines by increasing or decreasing the outer diameter of the plug 100. By way of non-limiting example, the plug 100 may be sized to accommodate pipelines that have inner diameters that range from, for example, 4 to 8 inches, 6 to 10 inches, 8 to 16 inches, 12 to 18 inches, 12 to 24 inches, 18 to 24 inches, and 24 to 36 inches.

The flow-through conduit 106 provides an internal passageway through the plug 100. The conduit 106 functions as a bypass to allow a controlled amount of fluid to pass through the plug 100 as needed during a test, repair, or construction operation while utilizing the plug 100. The conduit 106 may be structurally reinforced with a spring member (not shown) so that when the plug 100 is inflated, the conduit 106 will not collapse or otherwise be affected by high pressures within the plug 100.

The first end plate assembly 102 may include a first plate. The first plate may comprise metal, for example, steel, or any other suitable metal having desirable strength characteristics known in the art of inflatable plugs. The first plate may include a plurality of apertures disposed around a periphery of an outer-facing surface of the first plate. The apertures may be configured to receive a plurality of complementary bolts so as to positionally fix the first end plate assembly 102 to the plug 100, and to seal the first end 110 of the plug 100. It will be appreciated that any number of apertures may be included on the first plate for receiving the bolts. It will also be appreciated that the first plate may include no apertures, and may instead include other sealing mechanisms, such as, but not limited to, glues, sealants, clips, fasteners, or other suitable sealing mechanisms known in the art.

The second end 112 of the plug 100 may include the second end plate assembly. The second end plate assembly includes a second plate that has a substantially similar configuration to the first plate. The second plate may also include a plurality of apertures that are configured to receive a plurality of complementary bolts so as to positionally fix the second end plate assembly to the plug 100, and to seal the second end 112 of the plug 100. It will be appreciated that the first plate and the second plate may have different configurations depending on, for example, the application or field requirements of the plug 100 such as a blank plate, single large diameter bypass, or other plate configuration.

The first end 110 and the second end 112 of the plug 100 may include elastomeric pads to facilitate the seal of the plug 100 with the first plate and the second plate, respectively. The elastomeric pads may comprise rubber, or any other elastomeric material known in the art that allows for inflation of the plug 100.

The first plate assembly 102 and the second plate assembly may comprise a first inner plate and a second inner plate, respectively, neither of which is visible in the figures. The first and second inner plates are disposed within the interior of the plug 100 at respective first and second ends 110 and 112. The first and second inner plates may be coupled to the first plate and the second plate, respectively, to secure the first end plate assembly 102 and the second end assembly to the tubular member 108. The first and second inner plates may comprise a metal, such as welded steel, or any other suitable metal having similar strength characteristics known in the art.

The tubular member 108 extends substantially parallel to the axis A from the first end 110 to the second end 112. The tubular member 108 comprises an elastomeric material that includes at least one layer. The at least one layer may include, for example, an internal layer (not visible in figures), a middle layer (not visible in figures), and an external layer 120. The middle layer is positioned on top of the internal layer such that the middle layer is positioned further radially outward from the axis A than the internal layer.

Similarly, the external layer 120 is positioned on top of the middle layer such that the external layer 120 is positioned further radially outward from the axis A than the middle layer. In an aspect, the elastomeric material comprises rubber. It will be appreciated that the tubular member 108 may include fewer or more layers.

The plug is formed by disposing each of the layers about a mandrel, such that the layers are positioned further radially outward from the axis A than the mandrel. The mandrel may facilitate the manufacture of the inflatable plug 100, and may be removed either before or after the plug 100 is vulcanized. The mandrel has a cylindrical body with a circular cross-section that extends between the first end 110 and the second end 112. In an aspect, the mandrel may comprise metal or other material used to facilitate the manufacture of the plug 100.

The internal layer is disposed on top of the mandrel and may comprise a cylindrical body that extends from first end 110 to the second end 112 along an outer surface of the mandrel. The internal layer has an inner surface that extends substantially parallel to the axis A in an axial direction A'. The axial direction A' being substantially parallel to the axis A and extending in a direction from the first end 110 to the second end 112. The first plate, the second plate, and the inner surface of the internal layer define a central chamber of the plug 100.

An inflation port (not shown) may be selectively inserted into one of the first and second ends 110 and 112 of the plug 100 to provide a passageway into the central chamber. For example, the inflation port may be inserted through the first end plate assembly 102 or the second end plate assembly. The inflation port may be used to fill the central chamber with an inflation medium to inflate the central chamber to a predetermined pressure (e.g., inflation pressure). With reference to FIG. 3, when the plug 100 is inflated to the predetermined pressure the tubular member 108 expands such that the elastomeric band 130 and/or the external layer 120 contact an inner surface 103 of the pipeline 101. The inflation medium may comprise air, water, or another medium known in the art to cause inflation of plug 100. The predetermined pressure may depend on the size of the plug 100, the size of the pipeline, the structural integrity of tubular member 108, or still other parameters. The predetermined pressure may include a range of pressures between 15 and 45 pounds per square inch (psi). Smaller size plugs 100 may require higher inflation pressure (e.g., 45 psi), and larger size plugs 100 may require smaller inflation pressure (e.g., 15 psi). It will be appreciated, that in some applications, the predetermined pressure may exceed 45 psi.

The middle layer is disposed on top of the internal layer and may comprise a cylindrical body that extends from the first end 110 to the second end 112 of the plug 100. The middle layer may comprise nylon fiber, aramid fiber, or other suitable fiber capable of providing structural integrity to the middle layer. The fiber may provide an additional measure of structural integrity to the middle layer when the middle layer is subjected to imbalanced internal or external pressures on the plug 100. The fiber extends from the first end 110 to the second end 112 of the plug 100.

The external layer 120 is disposed around the middle layer and may comprise a cylindrical body that extends from first end 110 to the second end 112 of the plug 100. The external layer 120 has an outer surface (e.g. top surface) that extends substantially parallel to the axis A in the axial direction A' when the plug 100 is in a deflated configuration.

The elastomeric band 130 is disposed around the outer surface of the external layer 120. The elastomeric band 130 extends substantially parallel to the axis A when the plug is in the deflated configuration. In the inflated configuration of the plug 100 (see FIG. 3), the elastomeric band 130 is configured to contact the inner surface 103 of the pipeline 101, forming a substantially fluid tight seal. In an aspect, the elastomeric band 130 comprises a rubber.

The band 130 is positioned between the first end and the second end of the tubular member 108 and extends about a circumference of the external layer 120. In the axial direction A', the band 130 may extend partially between the first end and the second end of the tubular member 108. In an aspect, the band 130 covers less than approximately 25% of the outer surface of the external layer 120. In an alternative aspect, the band 130 covers approximately 30% of the outer surface of the external layer 120. The band 130 extends continuously about the external layer 120 circumferentially and axially forming a single unitary band. For example, there may be no spacings, openings, or gaps within the band 130 along the axial direction A' and circumferential direction.

The elastomeric band 130 may be positioned at a center of the tubular member 108 along the axial direction A', such that a first end of the band 130 is spaced apart from the first end of the tubular member 108 by a distance that is substantially the same as a second end of the band 130 is spaced apart from the second end of the tubular member 108. It will be appreciated that the band 130 may be positioned at alternate locations along the outer surface of external layer 120 in the axial direction A'. For example, it is preferred to have the band 130 positioned at a location on the plug 100 that is intended to contact the pipeline 101 (e.g. the outer radial most location of the plug 100 when the plug 100 is in the inflated configuration). If the plug 100 is configured such that a location towards the first end 110 inflates radially outward from the axis A greater than any other location along the plug 100, then it is preferred to locate the band 130 at that particular location towards the first end 110. Similarly, if the plug 100 is configured such that a location towards the second end 112 inflates outward from the axis A greater than any other location along the plug 100, then it is preferred to locate the band 130 at that particular location towards the second end 112.

In an aspect, multiple bands 130 (e.g. two or more bands) may be positioned on the outer surface of the external layer 120. For example, a first band 130 and a second band 130 may be positioned on and spaced apart along the outer surface of the external layer 120. The first band 130 may be positioned at a first pipe contact location and the second band 130 may be positioned at a second pipe contact location.

The plug 100 may include other components that are used in inflatable plugs, such as, for example, additional support rings, elastomeric pads, fasteners, or still other components.

Figure 4:
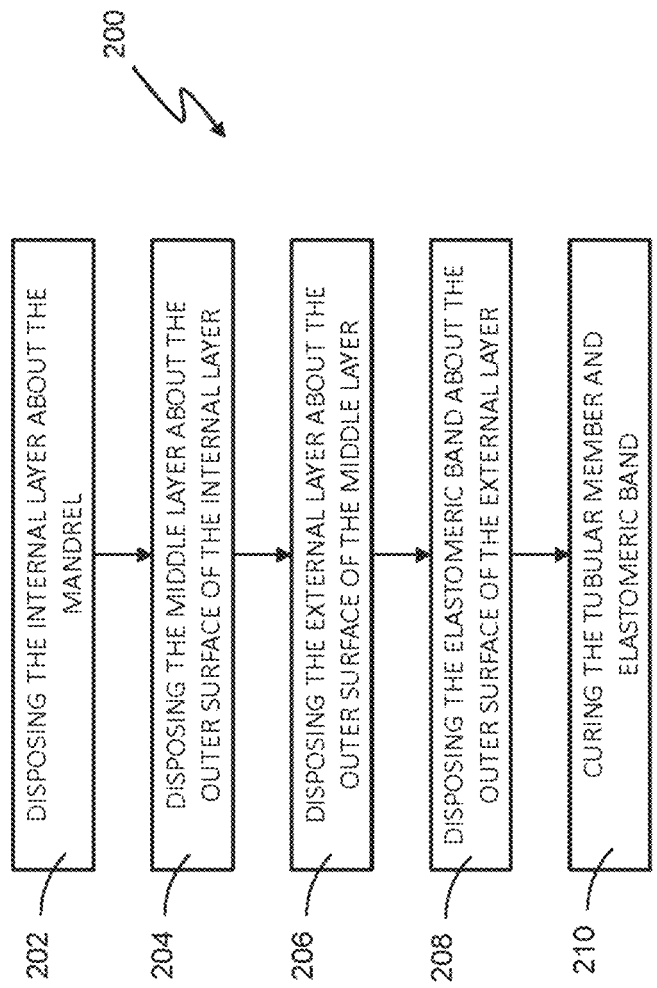
FIG. 4 illustrates a schematic of a method of manufacturing a pneumatic plug, according to an aspect of this disclosure.

FIG. 4 illustrates a method 200 of manufacturing the plug 100, according to an aspect of this disclosure. The plug 100 is manufactured by disposing (202) the internal layer (e.g. rubber layer) about the outer surface of the mandrel. The internal layer extends about the mandrel from the first end to the second end. The internal layer may be wound about the outer surface of the mandrel by rotating the mandrel about the axial axis A and disposing a strand of the internal layer from the first end to the second end of the mandrel and from the second end to the first end of the mandrel. Disposing the internal layer about a rotating mandrel forms an internal layer that has spiral strands that wrap around the mandrel.

After the internal layer has been disposed about the mandrel, the middle layer (e.g. fiber layer) is disposed (204)

on a top surface of the internal layer. The middle layer may include a plurality of fibers that extend from the first end to the second end of the mandrel. The plurality of fibers form a portion of the tubular member 108 and portions of the first and second ends 110 and 112 of the plug 100. The middle layer may be wound about the top surface of the internal layer by rotating the mandrel about the axial axis A and disposing the fibers of the middle layer from the first end to the second end of the mandrel and from the second end to the first end of the mandrel. It will be appreciated that each fiber disposed about the top surface of the internal layer may overlap one or more fibers.

After the middle layer has been disposed about the internal layer, the external layer 120 (e.g. second rubber layer) is disposed (206) on a top surface of the middle layer. The external layer 120 extends from the first end 110 to the second end 112 of the plug 100. The external layer 120 may be wound about the outer surface of the middle layer by rotating the mandrel about the axial axis A and disposing a strand of the external layer 120 from the first end 110 to the second end 112 of the plug 100 and from the second end 112 to the first end 110 of the plug 100. Disposing the external layer 124 about a rotating mandrel forms an external layer 120 that has spiral strands that wrap around the middle layer.

In alternative aspects, additional layers may be disposed on top of the external layer 120, such as a second fiber layer, a third rubber layer, etc. The additional fiber layers may be disposed on the outer surface of the plug 100 in a substantially similar manner as the middle layer is disposed on the internal layer. Similarly, the additional rubber layers may be disposed on the outer surface of the second fiber layer. The third rubber layer may be disposed on a top surface of the second fiber layer in a substantially similar manner as either the internal layer or the external layer 120 are disposed on the mandrel and the middle layer, respectively.

The internal layer, the middle layer, and the external layer 120 may each be positioned, as described above, by a winding device. The winding device may be positioned beside the mandrel and move back and forth substantially parallel to the axial axis A while disposing each layer of the tubular member 108. The winding device may be configured to dispose each layer to form the plug as described above.

In an alternative aspect, each layer may be disposed by different devices. For example, the middle layer may be disposed by the winding device, and the internal layer and the external layer 120 may be disposed by another device (e.g. a device configured to dispose rubber layers).

After the tubular member 108 is formed, the elastomeric band 130 is disposed (208) on the outer surface of the external layer 120. The band 130 may be positioned at the center of the tubular member 108 along the axial axis A. Alternatively, the band may be positioned at another location, as described above.

After the band 130 is disposed on the external layer 120, heat tape is wrapped about the external layer 120 and the band 130. The heat tape provides support to the shape of the plug 100 during curing. After the heat tape is disposed about the plug 100, the plug 100 is cured (210) to vulcanize the plug 100.

The inflatable plug 100 is beneficial during an operation to seal the inner surface 103 of the pipeline 101 at the plug 100 location. The elastomeric band 130 reduces leakage through the plug 100 when the plug 100 is positioned within the pipeline 101. When sealing the pipeline 101, the plug 100 may be inserted into the pipeline 101, and the central chamber of the plug 100 may be inflated to the predetermined pressure so that the elastomeric band 130 contacts the inner surface 103 of the pipeline 101. The contact between the elastomeric band 130 of the plug 100 and the inner surface 103 of the pipeline 101 creates a substantially fluid tight seal. After the pipeline 101 is sealed by the plug 100, the repair, maintenance, testing, or other activity regarding the pipeline may commence. After the pipeline activity is complete, the central chamber of the plug 100 may be deflated and the plug 100 may be withdrawn from the pipeline 101. As described above, the plug 100 may be configured and sized to accommodate pipelines that have a wide range of inner diameters.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

What is claimed is:

1. A method for manufacturing a pneumatic plug, the method comprising:
   disposing a rubber layer about a mandrel, the rubber layer extending in an axial direction from a first end to a second end forming a tubular member; and
   positioning an elastomeric band between the first end and the second end of the tubular member on a top surface of the rubber layer,
   wherein
   the pneumatic plug comprises a first end having a maximum outer diameter positioned at a first terminus of the tubular member, a second end having a maximum outer diameter positioned at an opposing terminus of the tubular member, and the tubular member extending between the first end and the second end, and,
   the tubular member comprises an unexpanded state and an expanded state, wherein in the unexpanded state the tubular member has a cylindrical configuration in which an outer diameter of the tubular member about which the elastomeric band is positioned is the same as the maximum outer diameter of first end and the maximum outer diameter of the second end.

2. The method of claim 1, further comprising:
   disposing a fiber layer about the mandrel, wherein the fiber layer is disposed on a top surface of the rubber layer, the fiber layer including a plurality of fibers extending from the first end to the second end of the tubular member.

3. The method of claim 2, wherein the rubber layer is a first rubber layer, the method further comprising: disposing a second rubber layer about the mandrel, the second rubber layer extending in the axial direction from the first end to the second end forming the tubular member, wherein the fiber layer is disposed on a top surface of the second rubber layer.

4. The method of claim 1, wherein the elastomeric band extends partially between the first end and the second end of the tubular member.

5. The method of claim 4, wherein the elastomeric band covers less than approximately 25% of the top surface of the rubber layer.

6. The method of claim 1, wherein the elastomeric band is positioned at a center of the tubular member such that a first end of the elastomeric band is spaced apart from the first end of the tubular member by a distance that is substantially the same as a distance a second end of the elastomeric band is spaced apart from the second end of the tubular member.

7. The method of claim 1, further comprising:
 curing the tubular member and the elastomeric band positioned on the top surface of the rubber layer to form a vulcanized plug.

8. The method of claim 1, wherein the elastomeric band covers approximately 30% of the top surface of the rubber layer.

9. The method of claim 1, wherein the pneumatic plug includes only a single elastomeric band.

* * * * *